April 11, 1967 G. C. TIBBETTS 3,313,018
METHOD OF MAKING DIAPHRAGM MEANS
FOR ACOUSTIC TRANSLATING DEVICES
Original Filed July 6, 1962 2 Sheets-Sheet 1
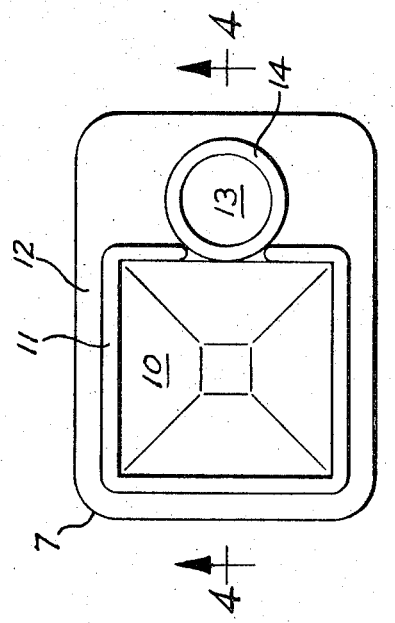
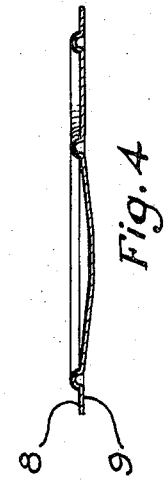
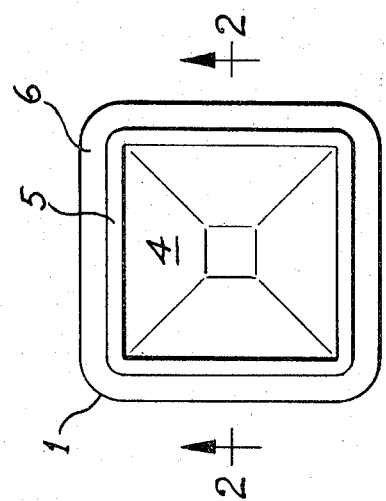
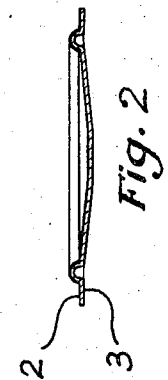
INVENTOR.
George C. Tibbetts
BY
Roberts, Cushman & Grover
ATT'YS April 11, 1967 G. C. TIBBETTS 3,313,018
METHOD OF MAKING DIAPHRAGM MEANS
FOR ACOUSTIC TRANSLATING DEVICES
Original Filed July 6, 1962 2 Sheets-Sheet 2
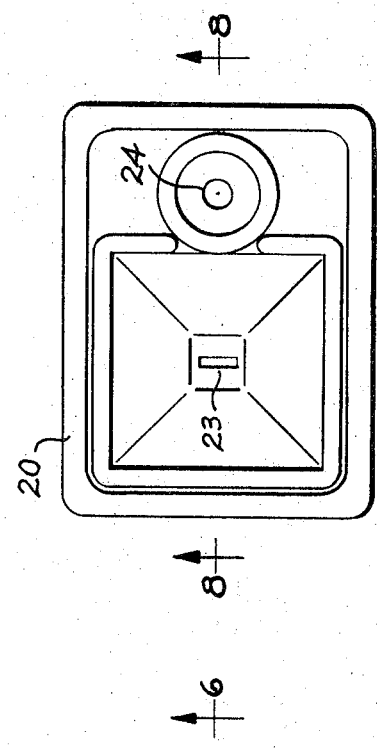
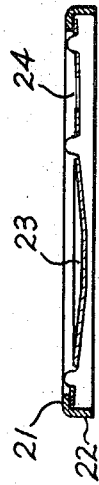
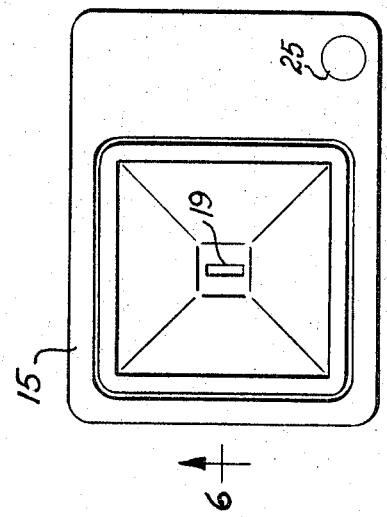
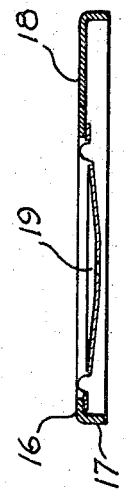
INVENTOR.
George C. Tibbetts
BY
Roberts, Cushman & Grover
ATT'YS

United States Patent Office 3,313,018
Patented Apr. 11, 1967

3,313,018
METHOD OF MAKING DIAPHRAGM MEANS FOR ACOUSTIC TRANSLATING DEVICES
George C. Tibbetts, Camden, Maine, assignor to Tibbetts Industries, Inc., Camden, Maine, a corporation of Maine
Original application July 6, 1962, Ser. No. 208,057, now Patent No. 3,166,148, dated Jan. 19, 1965. Divided and this application Apr. 20, 1964, Ser. No. 361,134
3 Claims. (Cl. 29—169.5)

This application is a division of application Ser. No. 208,057, filed July 6, 1962, and granted as Patent No. 3,166,148 on Jan. 19, 1965.

The present invention relates broadly to diaphragm means for acoustic translating devices, and more particularly is concerned with a sheet defining a diaphragm portion and adjacent areas as well as the method of making such sheet.

Accordingly, it is an object of this invention to provide a method for making a diaphragm means for an acoustic translating device, comprising a laminate sheet of materials of different elastic moduli such as metal foil and plastic film or coating, with portions of the metal removed to define appropriate diaphragm, surround, and attachment means portions.

These and further objects will be apparent from the accompanying specification and drawings in which:

FIG. 1 is a plan view of a laminate blank formed as a preliminary step in providing a diaphragm according to the invention;

FIG. 2 is a section along line 2—2 of FIG. 1;

FIG. 3 is a plan view of a laminate blank for a different embodiment of diaphragm means formed according to the invention;

FIG. 4 is a section along line 4—4 of FIG. 3;

FIG. 5 is a plan view of the diaphragm corresponding to FIG. 1 mounted in a frame;

FIG. 6 is a section along line 6—6 of FIG. 5;

FIG. 7 is a plan view of the diaphragm means corresponding to FIG. 3 mounted in a frame; and FIG. 8 is a section along line 8—8 of FIG. 7.

The invention is applicable to diaphragm means of any configuration, but for convenience is shown in the forms for the acoustic translating devices disclosed in copending application Ser. No. 168,183, filed Jan. 23, 1962. Referring to FIG. 1, element 1 may be a piece blanked out from a laminate sheet of metal and plastic. In particular, the sheet may comprise aluminum foil on which a plastic such as a fluorcarbon resin in dispersion form is coated and flows upon baking so as to be self-adhesive to the aluminum. FIG. 2 indicates the aluminum layer 2 and relatively thin plastic layer 3 laminated therewith. By the above process of lamination, the plastic layer may be obtained thinner than by adhering a layer of aluminum to plastic by an intermediate adhesive. The blank may then be formed to the entire shape desired for the diaphragm means, and FIG. 1 shows a central diaphragm portion 4, a diaphragm surround portion 5, and a peripheral support area 6. The diaphragm portion and surround portion may be pressed out of the plane of the sheet, and as shown in FIG. 2 they may extend in opposite directions relative to the plane of the sheet. After the desired shape is embossed in the sheet by appropriate cold-forming methods, the shaped blanks may be treated to substantially relieve the stresses in the plastic. For example, the shaped blanks may be treated by exposing them for a sufficient time to the vapor of an appropriate solvent or by placing them in an oven and heating to a sufficient temperature. In this manner the plastic is remolded to the shape of its own aluminum form which thereby functions as a single surface die. Thereafter the stress relieving process may be continued as desired. For example, the oven may be programmed to have a linear decrease of temperature with time until room temperature is attained.

The material of lower elastic modulus need not be thermoplastic throughout the above process. For example a plastic of lower softening range such as polyethylene may be applied to the material of higher elastic modulus as by coating aluminum from a hot solution of polyethylene. A cross-linking agent such as dicumyl peroxide may be mixed with the polyethylene solution, which agent is unaffected by the relatively low temperatures of the coating operation and subsequent storage, but which effects cross-linking, after the blank is cold formed, upon exposure to the appropriate higher temperatures necessary to effect stress-relieving and cross-linking. In this way the creep resistance of the lower softening range plastics may be markedly increased so as to render them suitable for use in the present invention, particularly when applied to the acoustic impedance means disclosed in copending application Ser. No. 168,183. Alternatively no cross-linking agent need be added to the plastic coating, cross-linking subsequent to stress-relieving being obtained by subjecting the plastic face of the formed blank to appropriate radiation such as an electron beam of sufficient energy effectively to penetrate the entire thickness of the plastic layer.

FIGS. 3 and 4 show a different embodiment of diaphragm means wherein the blank 7 having layers of metal 8 and plastic 9 may be shaped to have a diaphragm portion 10, a diaphragm surround 11, a peripheral support area 12, as well as a support area 13 and a surround 14 for said support area comprising part of an impedance means as discussed in copending application Ser. No. 168,183.

After the blank is treated, as by being heated and then cooled to room temperature, as described above, it may be bonded into a supporting frame by an appropriate adhesive such as epoxy, to provide a source of structural integrity and a means for handling for further operations completing the diaphragm means, which becomes very delicate when so completed. Furthermore, the frame is an important part of the structure as a mounting and locating means in the complete acoustic translating device, as disclosed in copending application Ser. No. 168,183.

Referring particularly to FIGS. 5 and 6, there is shown a supporting frame 15 having a portion 16 parallel to the plane of the diaphragm means and a surrounding rim 17. The portion 16 may also include an area 18 which may have an aperture 25 to carry an impedance means such as a Thuras tube as disclosed in copending application Ser. No. 168,183.

After mounting in the frame, whatever part of the aluminum that is still available within the frame may be coated with a photomechanical resist. Any well known resist may be employed such as Kodak Photo Resist, an organic solvent solution of a light-sensitive plastic. A mask may then be oriented upon the diaphragm means to cover any areas that are later to be etched free of aluminum. For example, in this instance a mask would be placed to cover the surround 5 and other portions outwardly thereof, thus leaving resist only on the central diaphragm portion 4. The masked diaphragm means may be exposed to ultra-violet light or other suitable radiation to cross-link the photomechanical resist where the radiation strikes it. The mask may then be removed, and the resist developed in a suitable solvent mixture, whereby the unexposed resist is removed. It is contemplated that photomechanical resists may alternatively be employed that develop off where exposed to radiation, conversely to the above. The above coating, exposing, and developing steps may be replaced by a step of printing an ink type resist directly on the areas desired, with no resist printed on the areas to be etched free of aluminum. Then the diaphragm means may be subjected to an appropriate etch such as hydrochloric acid to etch off the aluminum wherever the resist is lacking. The frame 15 must be capable of sufficiently resisting the etch; in this particular example brass is suitable.

As seen in FIG. 6, the aluminum is etched off the surround but remains on the diaphragm portion as well as on the portion between the plastic and frame. After the etching solution is removed, further steps may be taken as necessary to prepare the diaphragm means for insertion in the acoustic transducer. For example, an aperture 19 may be punched in the diaphragm portion to permit the passage therethrough of the drive pin of the acoustic translating device for attachment to the diaphragm.

Similarly, FIGS. 7 and 8 show the different embodiment having a frame 20 with a part 21 parallel to the plane of the diaphragm and a surrounding rim 22. Holes may be punched through the sheet at 23 for the passage of the drive pin as described above, and at 24 for the passage therethrough of a locating boss of the mass element of the impedance means as disclosed in copending application Ser. No. 168,183.

It should be understood that the present disclosure is for the purpose of illustration only and that this invention includes all modifications and equivalents which fall within the scope of the appended claims.

I claim:

1. A method of making a diaphragm means for an acoustic translating device comprising the steps of: forming in the shape of a diaphragm portion and a surround portion a blank of a laminate sheet comprising two materials of differing elastic moduli, relieving stresses in the material of lower elastic modulus to mold its natural shape substantially to the form defined by the material of higher elastic modulus, and removing said material of higher elastic modulus at said surround portion.

2. A method of making a diaphragm means for an acoustic translating device comprising the steps of: forming a blank of a laminate sheet of metal and plastic in the shape of a diaphragm portion and surround, heating the formed blank to a temperature sufficient to substantially relieve stresses in the plastic and thereby to mold the plastic by its own metal form, bonding the formed blank into a surrounding support frame, coating the available metal with a resist, processing the resist coating to retain the coating on the areas desired, and etching off the metal elsewhere.

3. A method of making a diaphragm means for an acoustic translating device comprising the steps of: forming a blank of a laminate sheet of metal and plastic in the shape of a diaphragm portion and surround, heating the formed blank to a temperature sufficient to substantially relieve stresses in the plastic and thereby to mold the plastic by its own metal form, bonding the formed blank into a surrounding support frame, printing a resist on the diaphragm portion, and etching off the metal at the surround.

References Cited by the Examiner
UNITED STATES PATENTS

| | | | |
|---|---|---|---|
| 1,757,451 | 5/1930 | Crane | 181—32 |
| 1,947,362 | 2/1934 | Schoenhut | 181—32 |
| 2,030,501 | 2/1936 | Cunningham | 181—32 |
| 3,153,278 | 10/1964 | Martin et al. | 29—424 |
| 3,192,619 | 7/1965 | Rausch et al. | 29—424 |

JOHN F. CAMPBELL, *Primary Examiner.*

THOMAS H. EAGER, *Examiner.*